(12) United States Patent
Deng et al.

(10) Patent No.: US 12,109,968 B1
(45) Date of Patent: Oct. 8, 2024

(54) SEAT AIRBAG ASSEMBLY

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/337,076

(22) Filed: Jun. 19, 2023

(51) Int. Cl.
| | |
|---|---|
| *B60R 21/231* | (2011.01) |
| *B60N 2/20* | (2006.01) |
| *B60R 21/015* | (2006.01) |
| *B60R 21/207* | (2006.01) |
| *B60R 21/233* | (2006.01) |
| *B60R 21/239* | (2006.01) |
| *B60R 21/261* | (2011.01) |
| *B60R 21/01* | (2006.01) |
| *B60R 21/26* | (2011.01) |

(52) U.S. Cl.
CPC ........ *B60R 21/23138* (2013.01); *B60N 2/206* (2013.01); *B60R 21/01512* (2014.10); *B60R 21/207* (2013.01); *B60R 21/233* (2013.01); *B60R 21/239* (2013.01); *B60R 21/261* (2013.01); *B60R 2021/01211* (2013.01); *B60R 2021/01286* (2013.01); *B60R 2021/23107* (2013.01); *B60R 2021/23146* (2013.01); *B60R 2021/23308* (2013.01); *B60R 2021/26094* (2013.01); *B60R 2021/2615* (2013.01)

(58) Field of Classification Search
CPC ............ B60R 21/207; B60R 21/23138; B60R 21/239; B60R 2021/23146; B60R 2021/26094
See application file for complete search history.

(56) References Cited

U.S. PATENT DOCUMENTS

| | | | |
|---|---|---|---|
| 5,913,536 A * | 6/1999 | Brown .............. | B60R 21/23138 280/730.2 |
| 6,425,602 B1 * | 7/2002 | Al-Amin ............ | B60R 22/1951 280/730.2 |
| 7,048,300 B2 | 3/2006 | Honda et al. | |
| 7,413,220 B2 * | 8/2008 | Itoga ................... | B60R 22/1952 280/741 |
| 7,900,736 B2 * | 3/2011 | Breed ................... | B60N 2/853 177/144 |
| 9,889,815 B2 | 2/2018 | Morozini de Lira | |

(Continued)

FOREIGN PATENT DOCUMENTS

JP      2011126413 A     6/2011

OTHER PUBLICATIONS

Delozier, G., "Mercedes Pelvic Airbag Offersmore Protection for Driver and Passenger," Inventor Spot, Mar. 1, 2023, 4 pages.

*Primary Examiner* — Faye M Fleming
(74) *Attorney, Agent, or Firm* — Frank A. MacKenzie; Bejin Bieneman PLC (57) ABSTRACT

An assembly includes a vehicle seat including a seat back, an upper airbag mounted to the seat back, a lower airbag mounted to the seat back below the upper airbag, a flexible conduit fluidly coupling the upper airbag and the lower airbag, and a device actuatable between a first state permitting airflow through the conduit and a second state blocking airflow through the conduit.

20 Claims, 7 Drawing Sheets

(56) References Cited

U.S. PATENT DOCUMENTS

| | | | |
|---|---|---|---|
| 11,780,397 B2 * | 10/2023 | Ukita | B60R 21/207 |
| | | | 280/730.2 |
| 11,780,398 B2 * | 10/2023 | Fukumoto | B60R 21/207 |
| | | | 280/728.1 |
| 2016/0144818 A1 | 5/2016 | Mhm et al. | |
| 2022/0203922 A1 * | 6/2022 | Yamazaki | B60R 21/01516 |

* cited by examiner

SEAT AIRBAG ASSEMBLY

BACKGROUND

Vehicles are equipped with airbags. In the event of certain impacts, an inflator activates and provides inflation medium to the airbags, and the airbags pressurize and control the kinematics of occupants during the impact. The airbags are located at various positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

DETAILED DESCRIPTION

An assembly includes a vehicle seat including a seat back, an upper airbag mounted to the seat back, a lower airbag mounted to the seat back below the upper airbag, a flexible conduit fluidly coupling the upper airbag and the lower airbag, and a device actuatable between a first state permitting airflow through the conduit and a second state blocking airflow through the conduit.

In an example, the seat back may include an upper seat-back portion, a lower seat-back portion, and a pivot rotatably coupling the upper seat-back portion and the lower seat-back portion. In a further example, the upper airbag may be mounted to the upper seat-back portion, and the lower airbag may be mounted to the lower seat-back portion.

In another further example, the vehicle seat may include a seat bottom, and the lower seat-back portion may extend upward from the seat bottom.

In an example, the device may include a jaw actuatable to pinch the conduit closed.

In an example, the device may be pyrotechnically actuatable.

In an example, the device may be in the first state by default, and the device may be actuatable from the first state to the second state.

In an example, the assembly may further include an inflator positioned to inflate the upper airbag. In a further example, the inflator may be fluidly coupled to the lower airbag only via a path passing through the conduit.

In another further example, the assembly may further include a diffuser sleeve, the inflator may be positioned in the diffuser sleeve, and the diffuser sleeve may be shaped to direct airflow from the inflator to the upper airbag and to the conduit.

In another further example, the inflator may be activatable to inflate the upper airbag, and the device may be configured to actuate together with activation of the inflator.

In an example, the assembly may further include a computer communicatively coupled to the device, and the computer may be programmed to instruct the device to actuate. In a further example, the computer may be further programmed to instruct the device to actuate based on a size of an occupant of the vehicle seat.

In another further example, the computer may be further programmed to at least one of instruct the device to actuate to the second state in response to a size of an occupant of the vehicle seat being greater than a size threshold or instruct the device to actuate to the first state in response to the size of the occupant being less than the size threshold.

In another further example, the computer may be further programmed to instruct the device to actuate based on a position of an occupant of the vehicle seat.

In another further example, the computer may be further programmed to at least one of instruct the device to actuate to the second state in response to an occupant of the vehicle seat being out of an occupant position or instruct the device to actuate to the first state in response to the occupant being in the occupant position.

In an example, the vehicle seat may be a fold-flat seat.

In an example, the vehicle seat may include a seat bottom, and the lower airbag in an uninflated position may be positioned at least partially above the seat bottom.

In an example, the upper airbag may include an upper-airbag vent, and the lower airbag may include a lower-airbag vent.

With reference to the Figures, wherein like numerals indicate like parts throughout the several views, an assembly 105 of a vehicle 100 includes a vehicle seat 110 including a seat back 115, an upper airbag 120 mounted to the seat back 115, a lower airbag 125 mounted to the seat back 115 below the upper airbag 120, a flexible conduit 130 fluidly coupling the upper airbag 120 and the lower airbag 125, and a device 135 actuatable between a first state permitting airflow through the conduit 130 and a second state blocking airflow through the conduit 130.

In the event of certain impacts, e.g., certain side impacts, at least one of the airbags 120, 125 inflates from an uninflated position to an inflated position. For example, the upper airbag 120 may inflate. The airbag or airbags 120, 125 in the inflated position may be positioned next to an occupant of the vehicle seat 110. The device 135 may be actuated to either permit or block airflow through the conduit 130 from the one of the airbags 120, 125 being inflated to the other of the airbags 120, 125. When the airflow is blocked, only one of the airbags 120, 125, e.g., the upper airbag 120, is inflated, with airflow to the other of the airbags 120, 125 being blocked, and the inflated airbag 120, 125 may be comparatively stiffer. When the airflow is permitted, both the airbags 120, 125 are inflated, e.g., via a single inflator 195 with airflow passing through the conduit 130, and the airbags 120, 125 may be comparatively less stiff. Selectively permitting or blocking the airflow between the airbags 120, 125 allows for customization of the inflation of the airbags 120, 125, e.g., based on size or positioning of the occupant.

Figure 1:
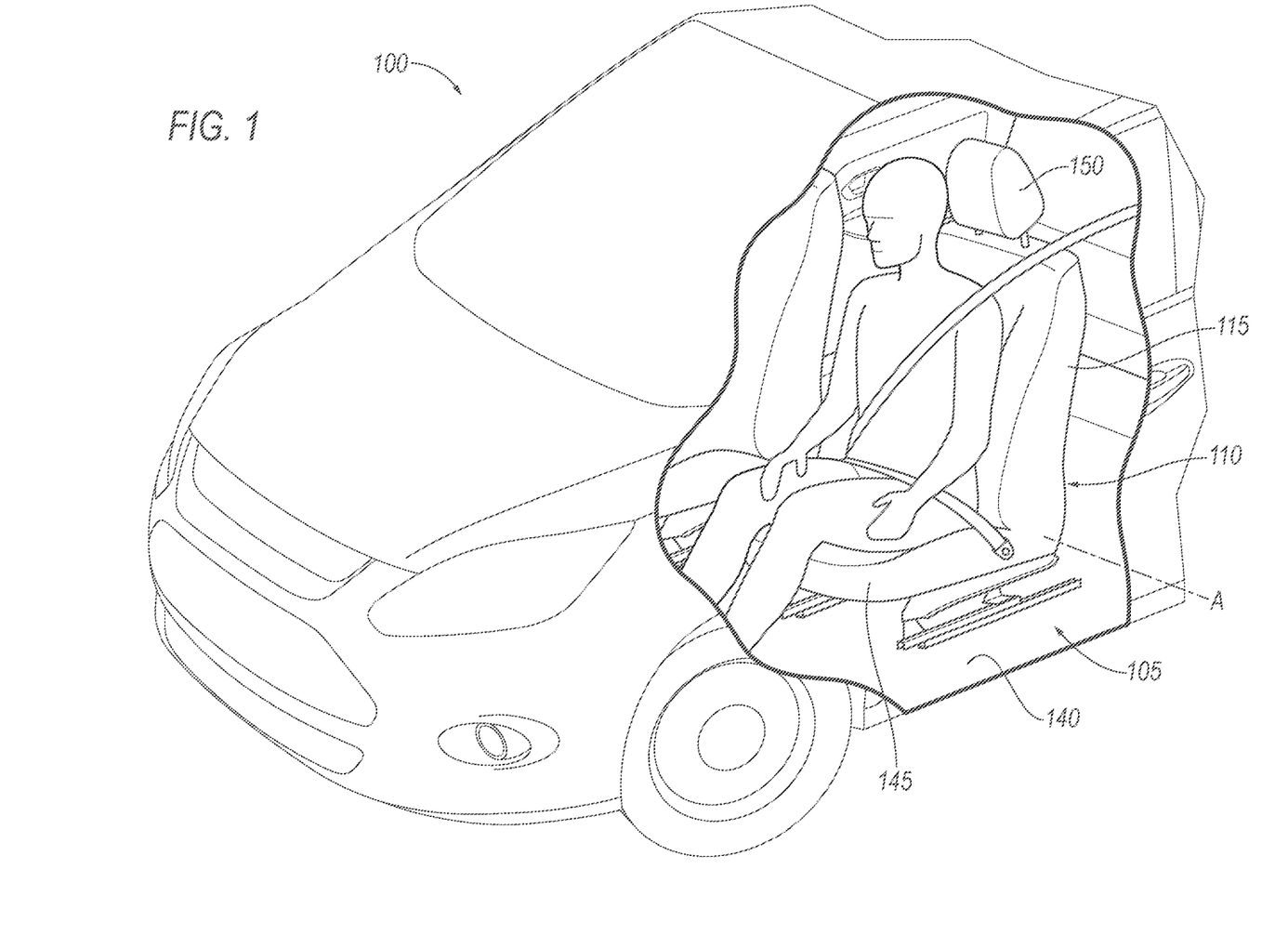
FIG. 1 is a perspective view of a portion of an example vehicle with a passenger compartment exposed for illustration.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 140 to house occupants of the vehicle 100. The passenger compartment 140 may include one or more of the vehicle seats 110 disposed in a front row of the passenger compartment 140 and one or more of the vehicle seats 110 disposed in a second row behind the front row. The passenger compartment 140 may also include vehicle seats 110 in a third-row (not shown) at a rear of the passenger cabin. The rest of this description discusses the assembly 105 for one vehicle seat 110, but multiple or all vehicle seats 110 in the passenger compartment 140 can each have an assembly 105 as described herein. The vehicle seats 110 may be bucket seats (as shown in the Figures), bench seats, etc. The position and orientation of the vehicle seats 110 and components thereof may be adjustable by an occupant.

Each vehicle seat 110 may include the seat back 115, a seat bottom 145, and a head restraint 150. The head restraint 150 may be supported by the seat back 115 and may be stationary or movable relative to the seat back 115. The seat back 115 may be supported by the seat bottom 145. The seat back 115 has a length extending generally upward from the seat bottom 145. The seat back 115, the seat bottom 145, and/or the head restraint 150 may be adjustable in multiple degrees of freedom, including but not limited to as described below.

The vehicle seat 110 includes a seat frame 155. The seat frame 155 may include tubes, beams, etc. The seat frame 155 may be of any suitable plastic material, e.g., carbon fiber reinforced plastic (CFRP), glass fiber-reinforced semi-finished thermoplastic composite (organosheet), etc. As another example, some or all components of the seat frame 155 may be formed of a suitable metal, e.g., steel, aluminum, etc.

The vehicle seat 110 includes a covering 160. The covering 160 may include cushions or padding covered with upholstery. The cushions may be made of cushioning material, e.g., foam or any other suitable supportive material. The upholstery may be formed of cloth, leather, faux leather, or any other suitable material. The upholstery may be stitched in panels around the foam.

Figure 2:
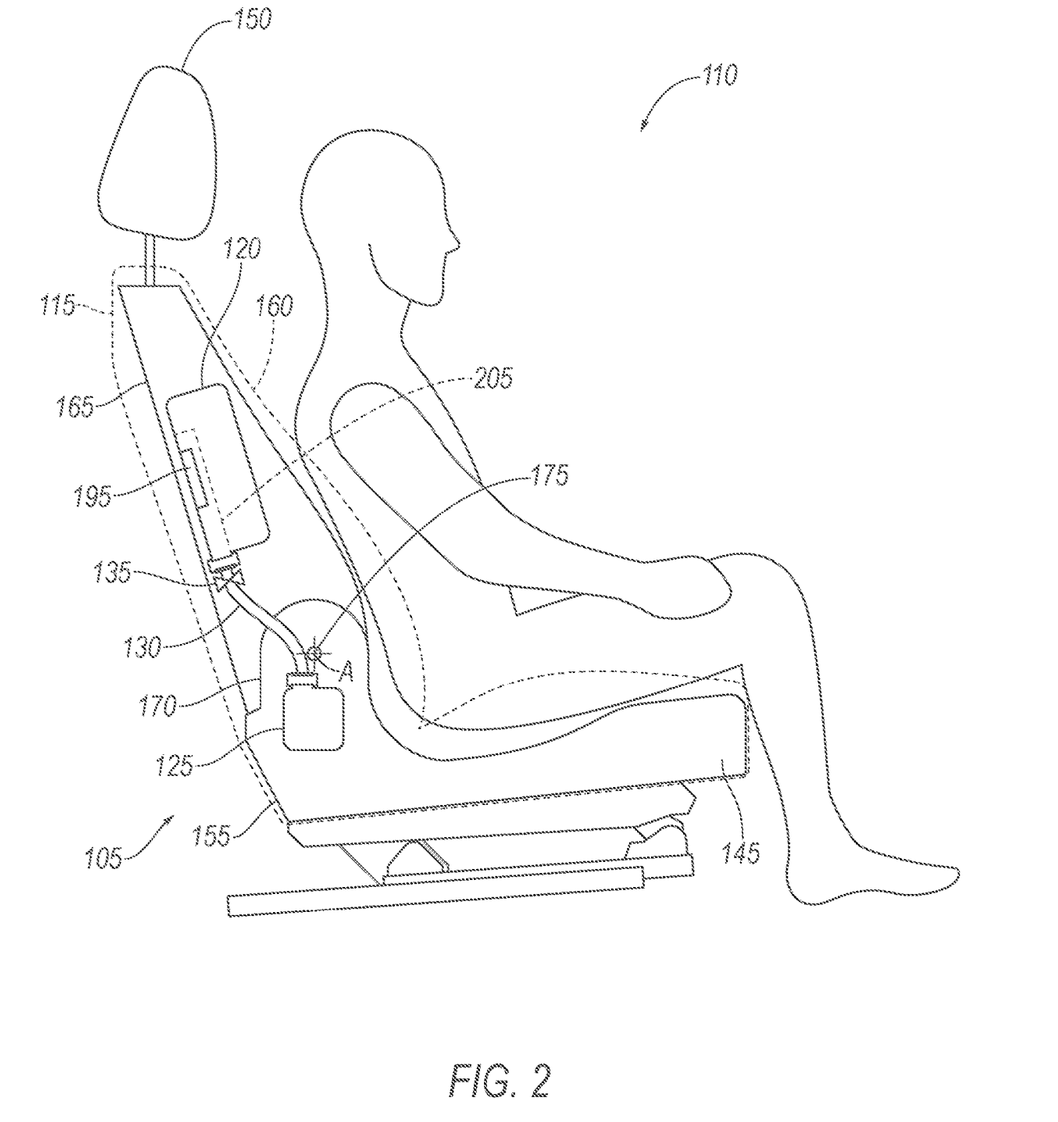
FIG. 2 is a side view of an example seat of the vehicle with an upper airbag and a lower airbag in uninflated positions.
Figure 3:
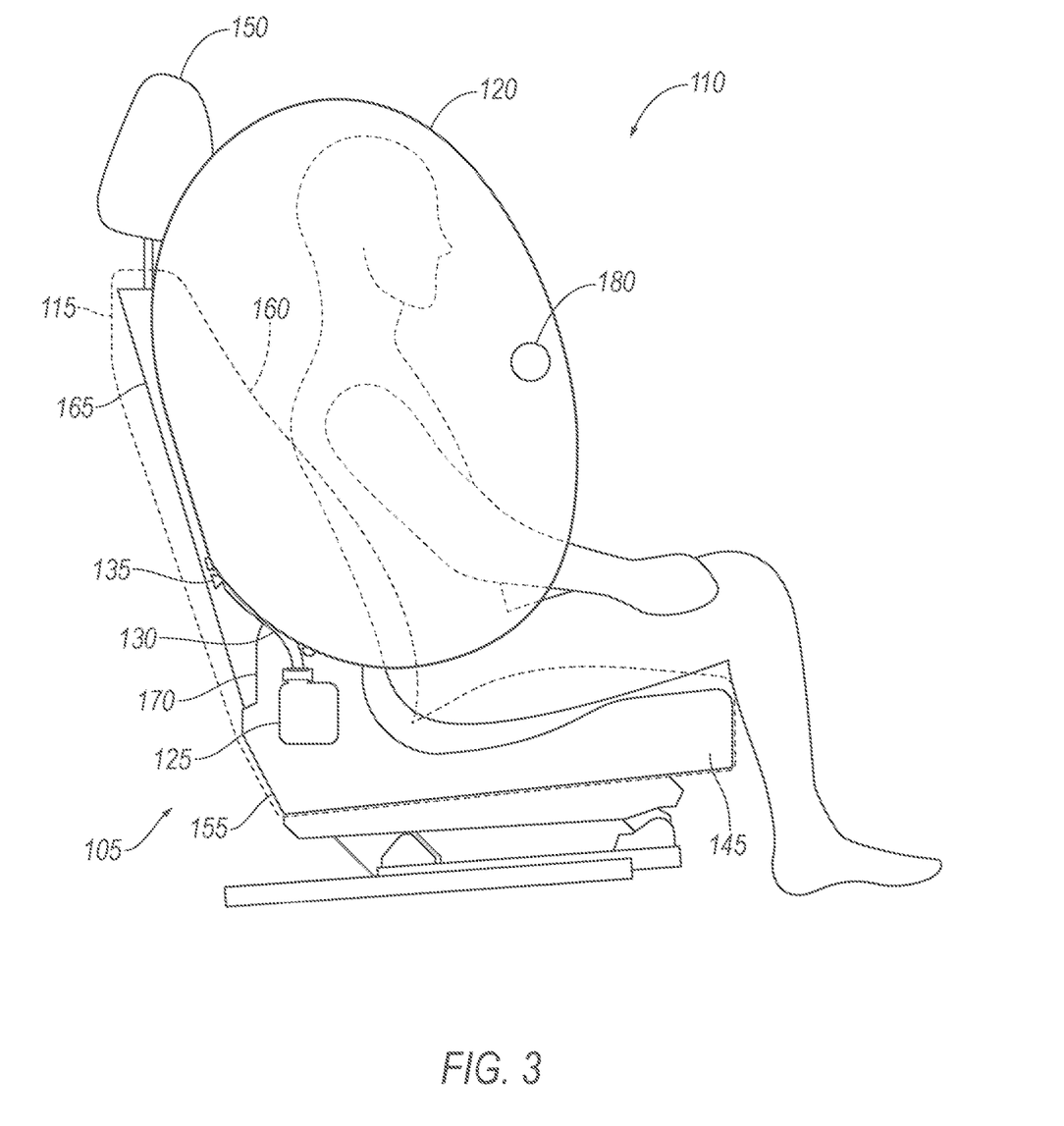
FIG. 3 is a side view of the seat with the upper airbag in an inflated position and the lower airbag in the uninflated position.
Figure 4:
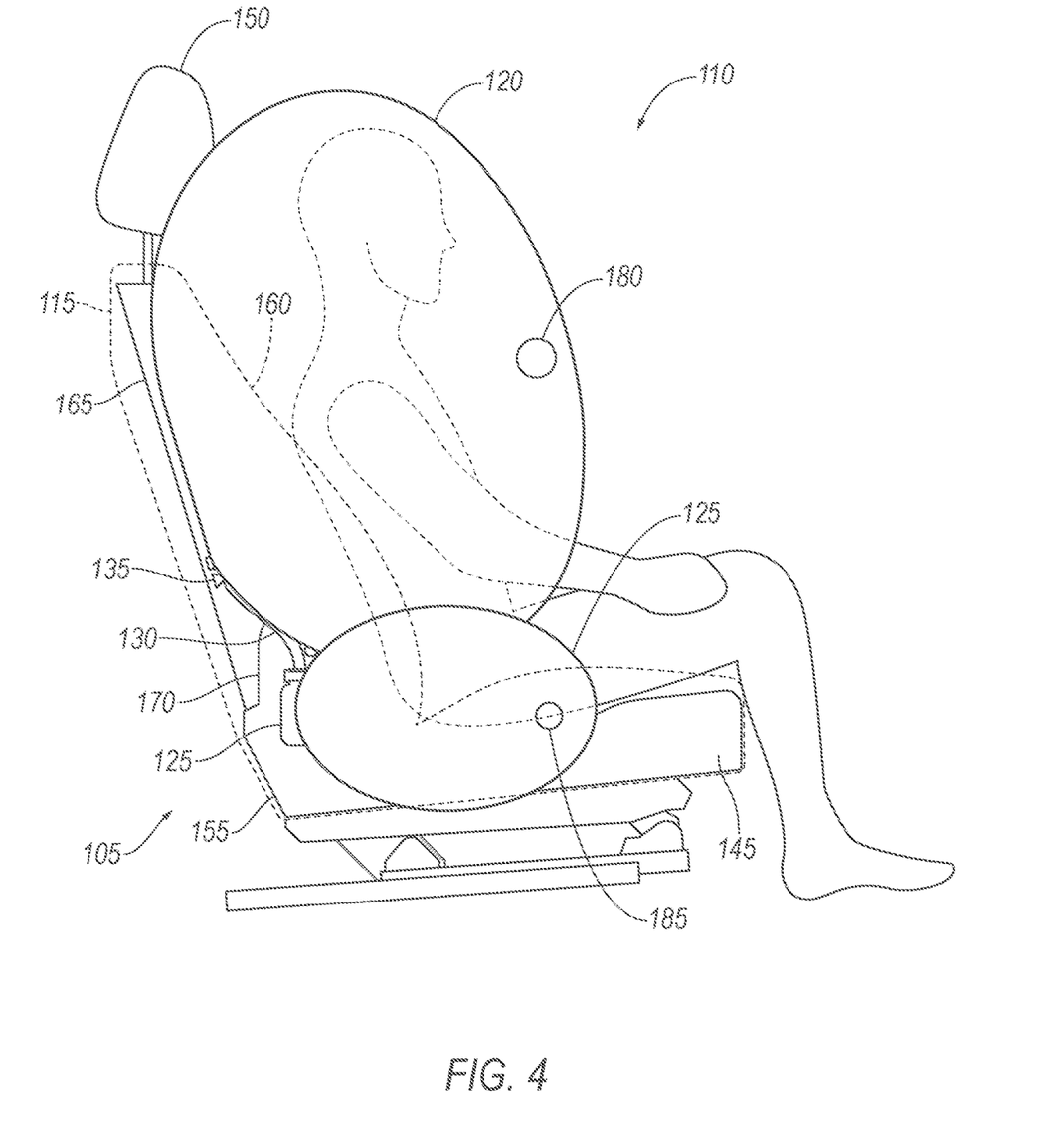
FIG. 4 is a side view of the seat with the upper airbag and the lower airbag in the inflated positions.

With reference to FIGS. 2-4, the vehicle seat 110 may be a fold-flat seat, i.e., a seat for which at least a portion of the seat back 115 folds forward to a horizontal position, thereby allowing items to be stored in the vehicle 100 on top of a back panel of the seat back 115. For example, the seat back 115 may include an upper seat-back portion 165, a lower seat-back portion 170, and a pivot 175 rotatably coupling the upper seat-back portion 165 and the lower seat-back portion 170. The lower seat-back portion 170 extends upward from the seat bottom 145. The lower seat-back portion 170 may be fixed or movable relative to the seat bottom 145. For example, as shown in the Figures, the lower seat-back portion 170 is fixed relative to the seat bottom 145, with the seat frame 155 including an integral piece for both the seat bottom 145 and the lower seat-back portion 170. The upper seat-back portion 165 is rotatable relative to the lower seat-back portion 170 around an axis A defined by the pivot 175. The axis A extends horizontally in a lateral, i.e., cross-seat, direction. The pivot 175 may be positioned at a lumbar region, e.g., above a pelvis and below a rib cage of a 50th percentile occupant sitting normally in the vehicle seat 110. The position of the pivot 175 permits the upper seat-back portion 165 to be rotated forward until the upper seat-back portion 165 contacts the seat bottom 145.

The upper airbag 120 is mounted to the seat back 115, e.g., to the upper seat-back portion 165. The upper airbag 120 may be mounted to a lateral side, e.g., an outboard side, of the seat frame 155 of the upper seat-back portion 165. The upper airbag 120 is inflatable from an uninflated position inside the upper seat-back portion 165, as shown in FIG. 2, to an inflated position extending outward and forward from the upper seat-back portion 165, as shown in FIGS. 3-4. The upper airbag 120 in the uninflated position is located inside or underneath the covering 160 of the upper seat-back portion 165. The covering 160 may include one or more tearaway seams that are opened by the inflation of the upper airbag 120. The upper airbag 120 in the inflated position is positioned laterally from an occupant sitting in the vehicle seat 110, e.g., between the occupant seating area and a door of the vehicle 100 in a cross-vehicle direction.

The lower airbag 125 mounted to the seat back 115 below the upper airbag 120, e.g., to the lower seat-back portion 170. The lower airbag 125 may be mounted to a lateral side, e.g., an outboard side, of the seat frame 155 of the lower seat-back portion 170. The lower airbag 125 is inflatable from an uninflated position inside the lower seat-back portion 170, as shown in FIGS. 2-3, to an inflated position extending outward and forward from the lower seat-back portion 170, as shown in FIG. 3. The lower airbag 125 in the uninflated position is located inside or underneath the covering 160 of the lower seat-back portion 170. The covering 160 may include one or more tearaway seams that are opened by the inflation of the lower airbag 125. The lower airbag 125 in the inflated position is positioned laterally from an occupant sitting in the vehicle seat 110, e.g., between the occupant seating area and a door of the vehicle 100 in a cross-vehicle direction. The lower airbag 125 in the uninflated position is positioned at least partially above the seat bottom 145.

The upper airbag 120 and lower airbag 125 may be formed of any suitable airbag material, for example, a woven polymer. For example, the upper airbag 120 and lower airbag 125 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The upper airbag 120 may include an upper-airbag vent 180, and the lower airbag 125 may include a lower-airbag vent 185. The vents 180, 185 may be, e.g., open vents, one-way vents, two-way vents, active vents, or any other suitable type for controlling a stiffness of the airbags 120, 125 over time. The vents 180, 185 may be used in combination with the device 135 to give the airbags 120, 125 defined stiffnesses when the device 135 permits airflow between the airbags 120, 125 and when the device 135 blocks airflow between the airbags 120, 125.

The assembly 105 includes the conduit 130. The conduit 130 fluidly couples the upper airbag 120 and the lower airbag 125, i.e., permits airflow between the upper airbag 120 and the lower airbag 125. If the conduit 130 is unblocked, air may flow from whichever of the airbags 120, 125 has a higher pressure to whichever of the airbags 120, 125 has a lower pressure. The conduit 130 is flexible, e.g., capable of curving between the upper seat-back portion 165 and the lower seat-back portion 170 when the upper seat-back portion 165 rotates about the pivot 175 relative to the lower seat-back portion 170, without damage such as tearing or plastic deformation. The conduit 130 may also be sufficiently flexible to be pinched closed by the device 135 (described below). For example, the conduit 130 may be an elastomeric material. For another example, the conduit 130 may be a same fabric as the airbags 120, 125, and the conduit 130 may share panels of fabric with one or both of the airbags 120, 125.

Figure 5:
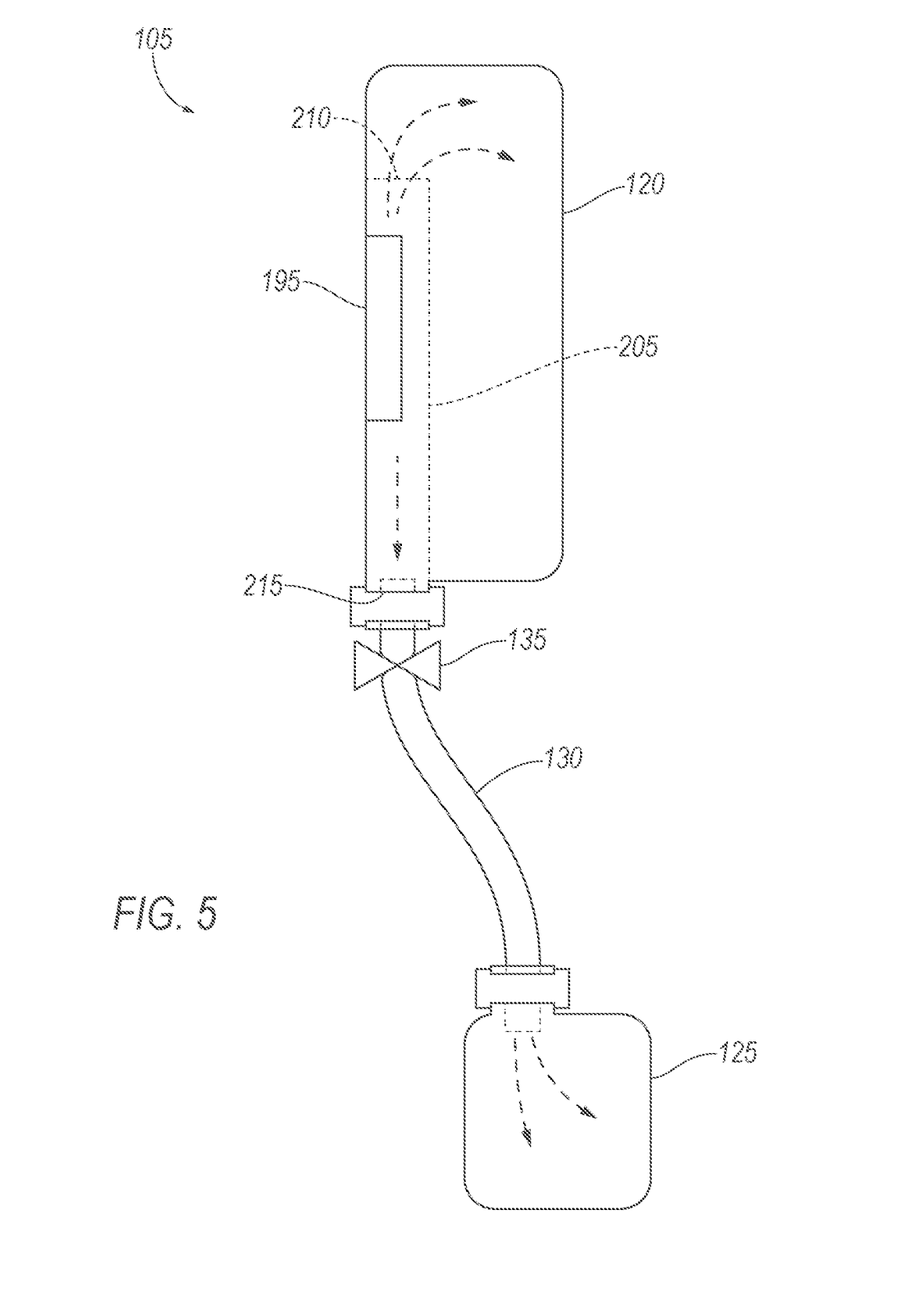
FIG. 5 is a diagrammatic view of an example airbag system of the seat.

With reference to FIG. 5, the assembly 105 may include an inflator 195 connected to one of the airbags 120, 125, e.g., the upper airbag 120. Upon receiving a signal from, e.g., a computer 200 (shown in FIG. 6), the inflator 195 may inflate the upper airbag 120 with an inflation medium, such as a gas. The inflator 195 may be, for example, a pyrotechnic inflator that uses a chemical reaction to drive inflation medium to the airbag. The inflator 195 may be of any suitable type, for example, cold-gas inflators.

The inflator 195 is positioned to inflate the upper airbag 120 and activatable to inflate the upper airbag 120. For example, the inflator 195 may be positioned inside the upper airbag 120. For another example, the inflator 195 may be fluidly coupled to the upper airbag 120 without any other airbag(s) therebetween. The inflator 195 may be fluidly coupled to the lower airbag 125 only via a path passing through the conduit 130, thereby permitting the device 135 to control airflow from the inflator 195 to the lower airbag 125. The inflator 195 may be mounted to the upper seat-back portion 165.

The assembly 105 may include a diffuser sleeve 205. The inflator 195 may be positioned in the diffuser sleeve 205. The diffuser sleeve 205 may be shaped to direct airflow from the inflator 195 to the upper airbag 120 and to the conduit 130. For example, the diffuser may have a tubular shape elongated between a first open end 210 and a second open end 215, the first open end 210 opening to the interior of the upper airbag 120 and the second open end 215 opening into the conduit 130, as shown in FIG. 5. The second open end 215 may be connected directly to the conduit 130. This arrangement for the diffuser sleeve 205 may effectively direct airflow into both the airbags 120, 125 at once if the conduit 130 is unblocked. Alternatively, the diffuser sleeve 205 may be shaped to direct airflow to the upper airbag 120, and the conduit 130 may be fluidly coupled to the upper airbag 120 at a point spaced from the diffuser sleeve 205.

The assembly 105 includes the device 135. The device 135 is actuatable between a first state permitting airflow through the conduit 130, i.e., an open state, and a second state blocking airflow through the conduit 130, i.e., a closed state. The device 135 may be in one of the states by default, and the device 135 may be actuatable from the default state to the nondefault state. For example, the device 135 may be in the first state by default, and the device 135 may be actuatable from the first state to the second state. The device 135 being in the first state by default may decrease fatigue by the conduit 130 by leaving the conduit 130 undeformed until the device 135 is actuated.

When the device 135 is in the first state, i.e., permitting airflow through the conduit 130, the inflation medium generated by the inflator 195 is split between the upper airbag 120 and the lower airbag 125. When the device 135 is in the second state, i.e., block airflow through the conduit 130, the inflation medium generated by the inflator 195 that would flow through the second open end 215 of the diffuser sleeve 205 is instead redirected to the first end of the diffuser sleeve 205 and into the upper airbag 120, thus concentrating more inflation medium in the upper airbag 120. The upper airbag 120 may thereby be stiffer when the device 135 is in the second state than when the device 135 is in the first state.

For example, the device 135 may include a jaw actuatable to pinch the conduit 130 closed. The jaw may be in an open position by default and may be actuatable from the open position to a closed position. The device 135 may lock in the second state, e.g., the closed position, when put into the second state. The device 135 may be pyrotechnically actuatable, which may be sufficiently quick to actuate the device 135 contemporaneously with activating the inflator 195. For example, a pyrotechnic actuator may pull one side or both sides of the jaw to the closed position. Alternatively, the device 135 may include a valve switchable between the first state and the second state.

Figure 6:
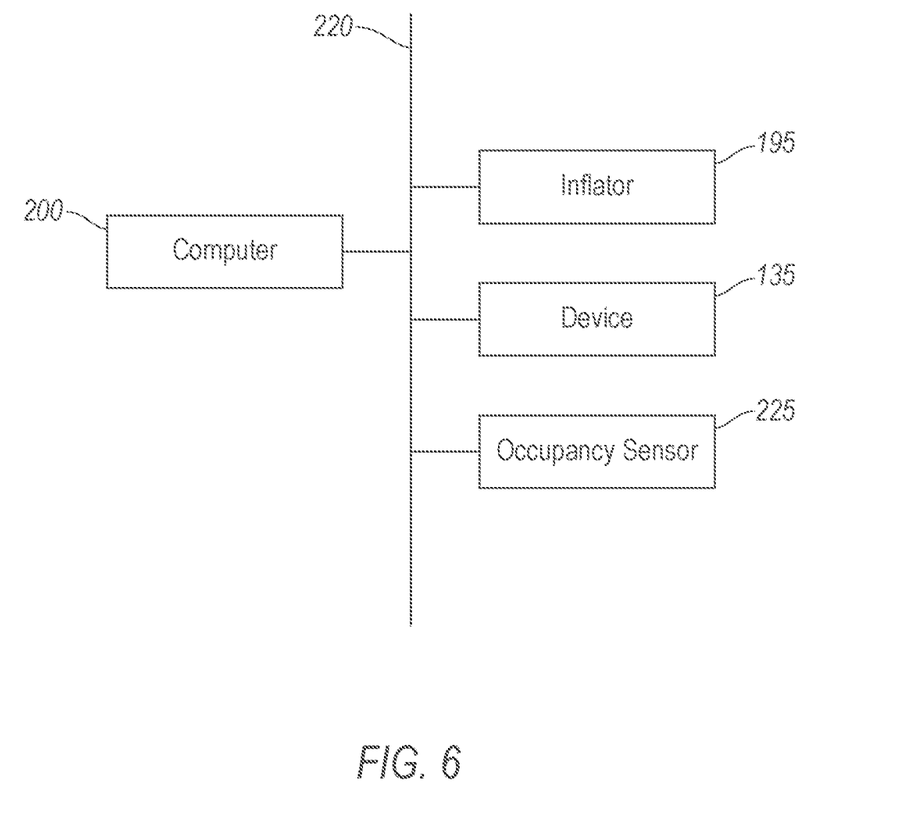
FIG. 6 is a block diagram of an example control system for the airbag system.

With reference to FIG. 6, the assembly 105 may include the computer 200. The computer 200 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 200 can thus include a processor, a memory, etc. The memory of the computer 200 can include media for storing instructions executable by the processor as well as for electronically storing data and/or databases, and/or the computer 200 can include structures such as the foregoing by which programming is provided. The computer 200 can be multiple computers coupled together.

The assembly 105 may include a communications network 220. The computer 200 may transmit and receive data through the communications network 220. The communications network 220 may be, e.g., a controller area network (CAN) bus, Ethernet, WiFi, Local Interconnect Network (LIN), onboard diagnostics connector (OBD-II), and/or any other wired or wireless communications network. The computer 200 may be communicatively coupled to the inflator 195, the device 135, an occupancy sensor 225, and other components via the communications network 220.

The assembly 105 may include the occupancy sensor 225. The occupancy sensor 225 is configured to detect occupancy of the vehicle seat 110. The occupancy sensor 225 may include a visible-light or infrared camera directed at the vehicle seat 110, a weight sensor inside the seat, a proximity sensor or the like for detecting whether a seatbelt for the vehicle seat 110 is buckled, a position sensor for detecting a longitudinal position of the vehicle seat 110 along tracks on a floor of the passenger compartment 140, and/or another suitable sensor.

The device 135 may be configured to actuate together with activation of the inflator 195. For example, the computer 200 may be programmed to instruct the device 135 to actuate and the inflator 195 to activate in response to a common stimulus, e.g., in response to detection of certain impacts to the vehicle 100. Thus, the device 135 can be maintained in the first state by default until the stimulus is detected, rather than switching states based on the factors below changing outside the context of the stimulus. Whether the computer 200 instructs the device 135 to actuate may depend on a size (e.g., stature) of the occupant or whether the occupant is in an occupant position, as will be described below, as well as possibly on other factors such as a severity of the stimulus.

The computer 200 may be programmed to instruct the device 135 to actuate based on a size, e.g., a stature or height, of the occupant of the vehicle seat 110. For example, the computer 200 may be programmed to at least one of instruct the device 135 to actuate to the second state in response to the size of the occupant being greater than a size threshold or instruct the device 135 to actuate to the first state in response to the size of the occupant being less than the size threshold. The size threshold may be a stature threshold or height threshold, e.g., a percentile between a fifth percentile female occupant and a fiftieth percentile occupant. The device 135 thus blocks airflow through the conduit 130 when the size of the occupant is above the size threshold and permits airflow through the conduit 130 when the size of the occupant is below the size threshold. The upper airbag 120 and the lower airbag 125 may be present and less stiff for shorter occupants, which may limit a force on the occupant compared to a stiffer upper airbag 120 and lower airbag 125, and the upper airbag 120 may be stiffer for taller occupants, which may limit a lateral deflection of the occupant compared to a less stiff upper airbag 120 and lower airbag 125.

The computer 200 may be programmed to instruct the device 135 to actuate based on a position of an occupant of the vehicle seat 110. For example, the computer 200 may be programmed to at least one of instruct the device 135 to actuate to the second state in response to the occupant being out of an occupant position (despite contrary instruction to the occupant in the owner's/user's manual) or instruct the device 135 to actuate to the first state in response to the occupant being in the occupant position. The occupant position may be an appropriate or preferred posture of the occupant in the vehicle seat 110, e.g., sitting upright with hips toward the back of the seat bottom 145. The device 135 thus blocks airflow through the conduit 130 when the occupant is out of the occupant position and permits airflow through the conduit 130 when the occupant is in the occupant position. The upper airbag 120 and the lower airbag 125 may be present and less stiff for occupants in the occupant position, which may limit a force on the occupant compared to a stiffer upper airbag 120 and lower airbag 125, and the upper airbag 120 may be stiffer for occupants out of the occupant position, which may limit a lateral deflection of the occupant compared to a less stiff upper airbag 120 and lower airbag 125.

Figure 7:
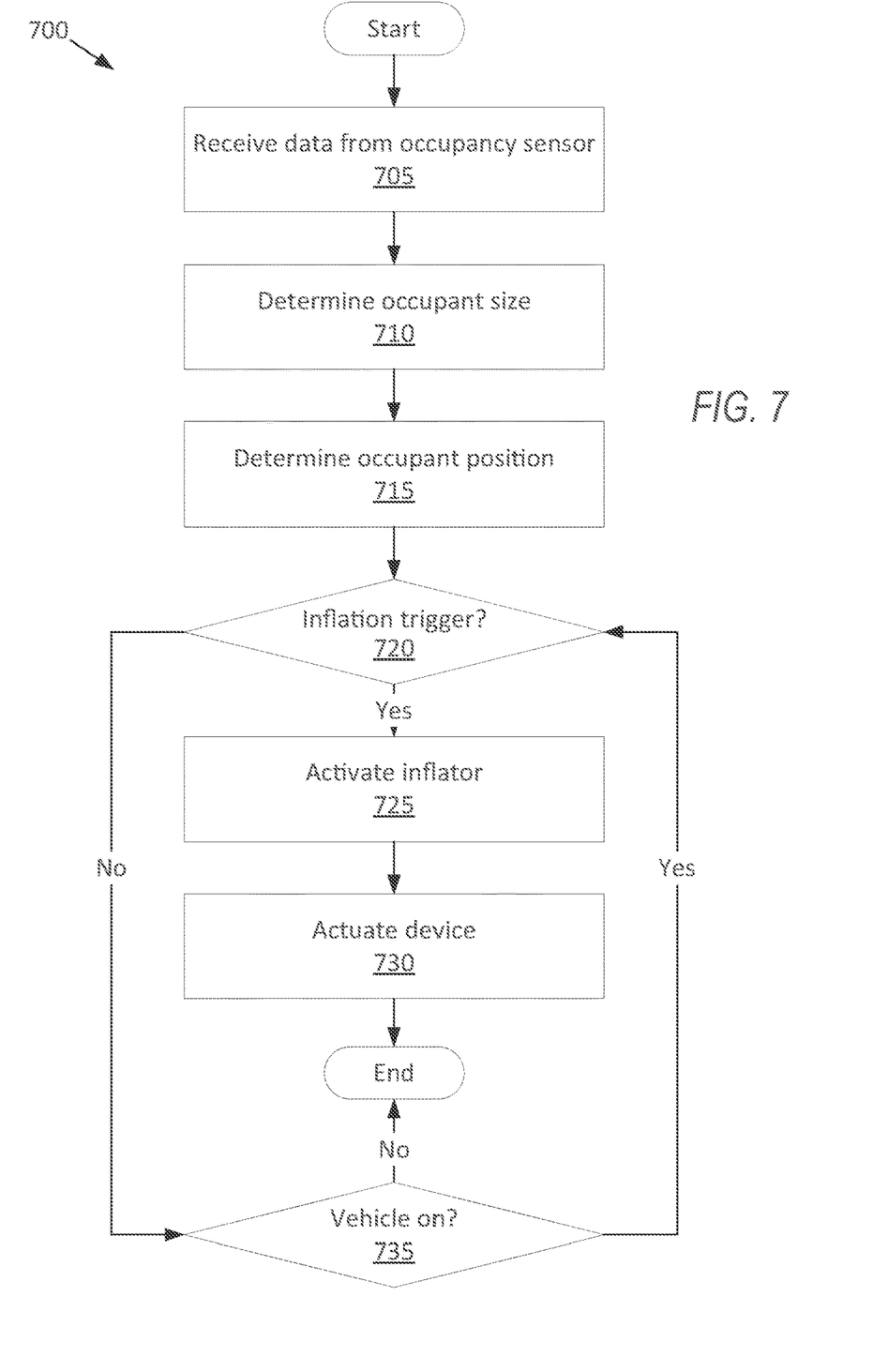
FIG. 7 is a flowchart of an example process for controlling the airbag system.

FIG. 7 is a flowchart illustrating an example process 700 for controlling the assembly 105. The memory of the computer 200 stores executable instructions for performing the steps of the process 700 and/or programming can be implemented in structures such as mentioned above. As a general overview of the process 700, the computer 200 receives data from the occupancy sensor 225, determines a size of the occupant, and determines a position of the occupant. In response to an inflation trigger, the computer 200 activates the inflator 195 and actuates the device 135 based on the size and position of the occupant. The computer 200 continues monitoring for the inflation trigger for as long as the vehicle 100 remains on.

The process 700 begins in a block 705, in which the computer 200 receives data from the occupancy sensor 225, as described above.

Next, in a block 710, the computer 200 determines the size of the occupant based on the data from the occupancy sensor 225. For example, the computer 200 may determine a longitudinal position of the vehicle seat 110 (which may be correlated with height), an estimation of stature based on a detected location of a head in image data showing the occupant, etc., or a composite metric combining these factors.

Next, in a block 715, the computer 200 determines the position of the occupant based on the data from the occupancy sensor 225. For example, the computer 200 may determine the position of the occupant based on image data showing the occupant sitting in the vehicle seat 110, e.g., based on object detection and object tracking algorithms applied to one or more body parts of the occupant, e.g., head, torso, thighs, etc.

Next, in a decision block 720, the computer 200 determines whether an inflation trigger has occurred, i.e., a stimulus for which the inflator 195 is activated. For example, the computer 200 may determines whether one of certain impacts has occurred. In response to the inflation trigger, the process 700 proceeds to a block 725. In response to a lack of the inflation trigger, the process 700 proceeds to a decision block 735.

In the block 725, the computer 200 instructs the inflator 195 to activate, thereby sending inflation medium through the diffuser sleeve 205 to the upper airbag 120 and toward the conduit 130.

Next, in a block 730, the computer 200 actuates the device 135 to block or permit airflow through the conduit 130, as described above. The computer 200 may actuate (or refrain from actuating) the device 135 to block airflow for an occupant above the size threshold and permit airflow for an occupant below the size threshold, as described above. The computer 200 may actuate (or refrain from actuating) the device 135 to block airflow for an occupant out of the occupant position and permit airflow for an occupant in the occupant position, as described above. When the size of the occupant and the position of the occupant indicate different states (e.g., when the size is above the threshold and the occupant is in the occupant position, or when the size is below the threshold and the occupant is out of the occupant position), the computer 200 may actuate (or refrain from actuating) the device 135 to block airflow through the conduit 130. After the block 730, the process 700 ends.

In the decision block 735, the computer 200 determines whether the vehicle 100 is still on. In response to the vehicle 100 being on, the process 700 returns to the decision block 720 to continue monitoring for an inflation trigger. In response to the vehicle 100 turning off, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. An assembly comprising:
    a vehicle seat including a seat back;
    an upper airbag mounted to the seat back;
    a lower airbag mounted to the seat back below the upper airbag;
    a flexible conduit fluidly coupling the upper airbag and the lower airbag; and
    a device actuatable between a first state permitting airflow through the conduit between the upper airbag and the lower airbag and a second state blocking airflow through the conduit between the upper airbag and the lower airbag.

2. The assembly of claim 1, wherein the seat back includes an upper seat-back portion, a lower seat-back portion, and a pivot rotatably coupling the upper seat-back portion and the lower seat-back portion.

3. The assembly of claim 2, wherein the upper airbag is mounted to the upper seat-back portion, and the lower airbag is mounted to the lower seat-back portion.

4. The assembly of claim 2, wherein the vehicle seat includes a seat bottom, and the lower seat-back portion extends upward from the seat bottom.

5. The assembly of claim 1, wherein the device includes a jaw actuatable to pinch the conduit closed.

6. The assembly of claim 1, wherein the device is pyrotechnically actuatable.

7. The assembly of claim 1, wherein the device is in the first state by default, and the device is actuatable from the first state to the second state.

8. The assembly of claim 1, further comprising an inflator positioned to inflate the upper airbag.

9. The assembly of claim 8, wherein the inflator is fluidly coupled to the lower airbag only via a path passing through the conduit.

10. The assembly of claim 8, further comprising a diffuser sleeve, wherein the inflator is positioned in the diffuser sleeve, and the diffuser sleeve is shaped to direct airflow from the inflator to the upper airbag and to the conduit.

11. The assembly of claim 8, wherein the inflator is activatable to inflate the upper airbag, and the device is configured to actuate together with activation of the inflator.

12. The assembly of claim 1, further comprising a computer communicatively coupled to the device, the computer programmed to instruct the device to actuate.

13. The assembly of claim 12, wherein the computer is further programmed to instruct the device to actuate based on a size of an occupant of the vehicle seat.

14. The assembly of claim 12, wherein the computer is further programmed to at least one of instruct the device to actuate to the second state in response to a size of an occupant of the vehicle seat being greater than a size threshold or instruct the device to actuate to the first state in response to the size of the occupant being less than the size threshold.

15. The assembly of claim 12, wherein the computer is further programmed to instruct the device to actuate based on a position of an occupant of the vehicle seat.

16. The assembly of claim 12, wherein the computer is further programmed to at least one of instruct the device to actuate to the second state in response to an occupant of the vehicle seat being out of an occupant position or instruct the device to actuate to the first state in response to the occupant being in the occupant position.

17. The assembly of claim 1, wherein the vehicle seat is a fold-flat seat.

18. The assembly of claim 1, wherein the vehicle seat includes a seat bottom, and the lower airbag in an uninflated position is positioned at least partially above the seat bottom.

19. The assembly of claim 1, wherein the upper airbag includes an upper-airbag vent, and the lower airbag includes a lower-airbag vent.

20. The assembly of claim 1, further comprising an inflator positioned to inflate one of the upper airbag or the lower airbag, wherein the conduit is separate from a path from the inflator to the one of the upper airbag or the lower airbag.

* * * * *